G. R. STRICKLAND.
CONVEYER FOR BINDING MACHINES.
APPLICATION FILED APR. 13, 1914.
1,135,146.
Patented Apr. 13, 1915.
3 SHEETS—SHEET 1.
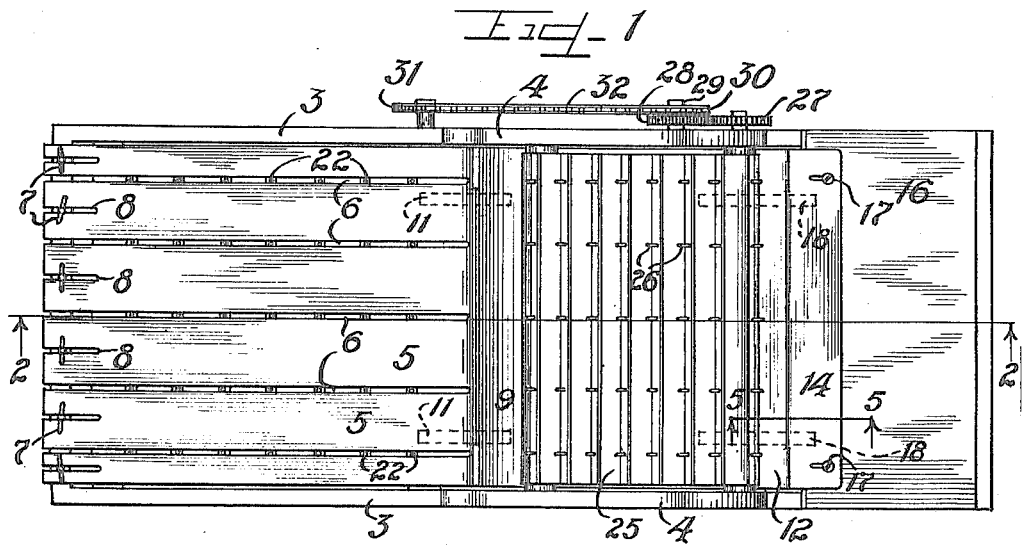
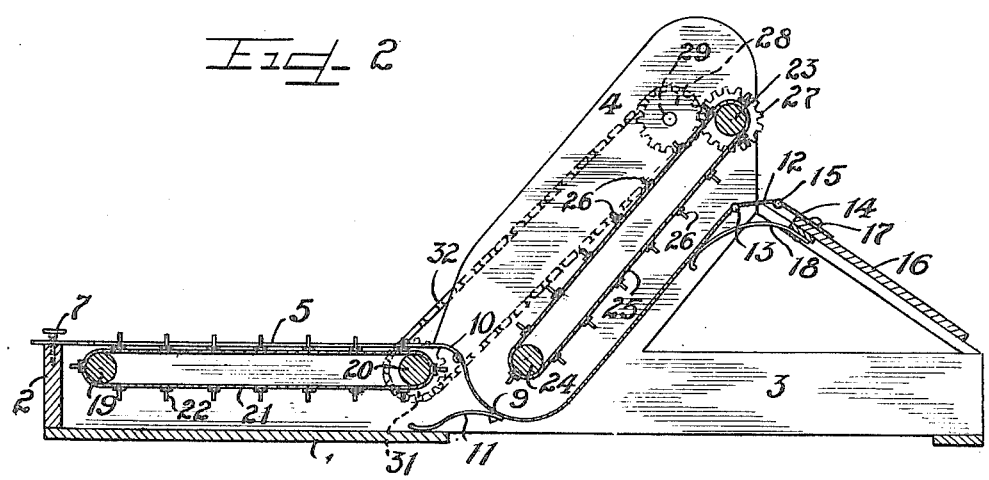
Witnesses
Victor Siljander.
Inventor
George R. Strickland

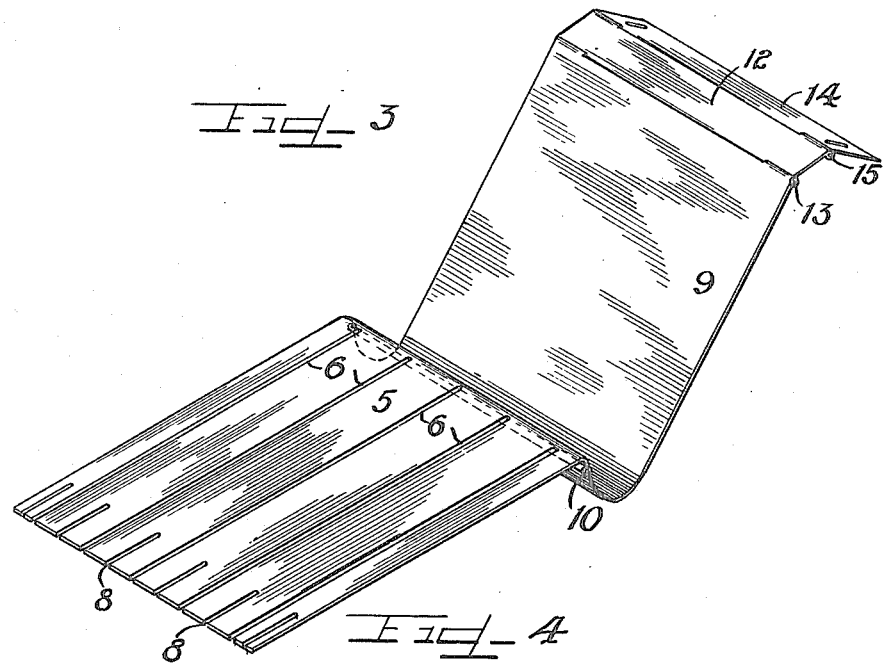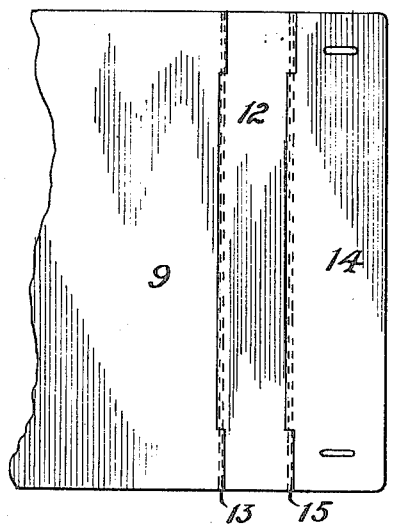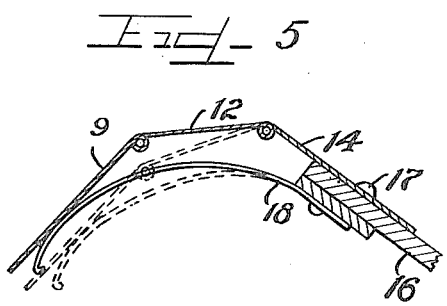

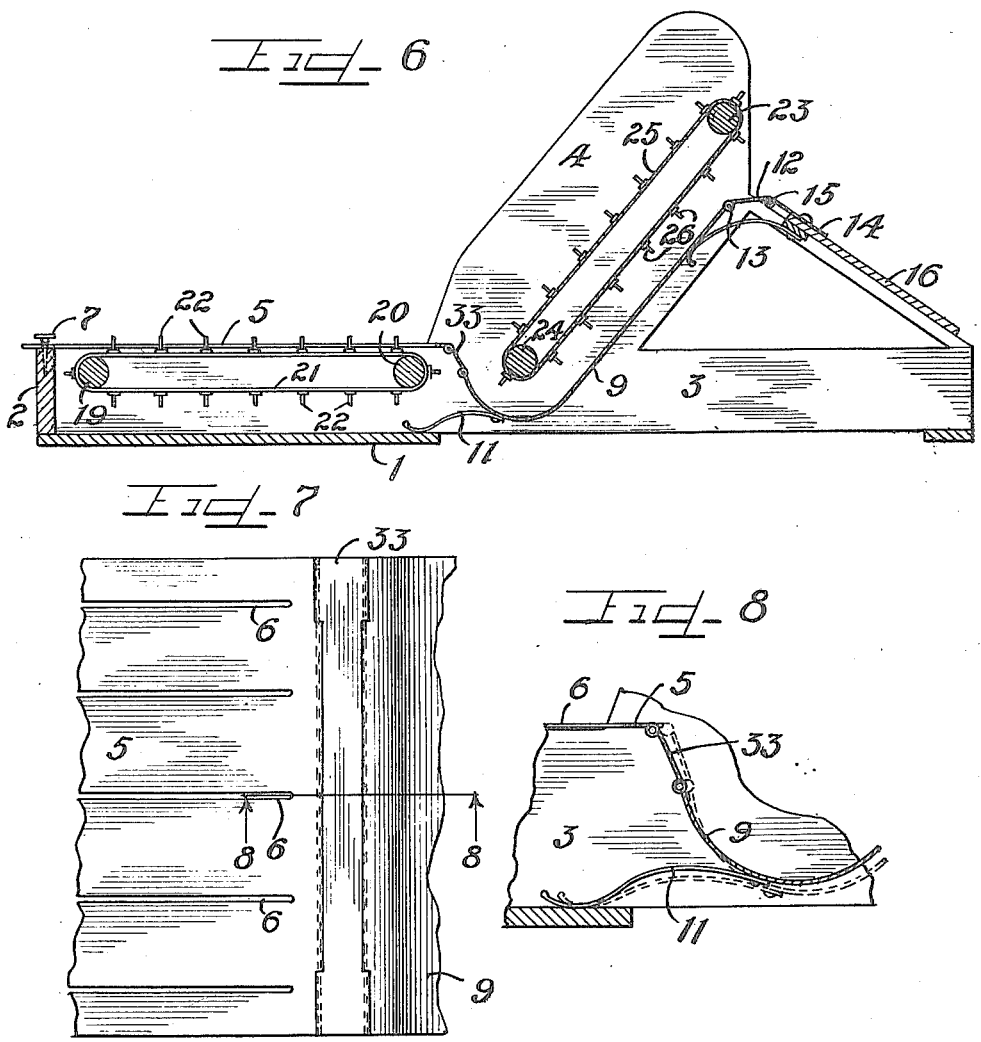

UNITED STATES PATENT OFFICE.

GEORGE R. STRICKLAND, OF CHICAGO, ILLINOIS, ASSIGNOR OF ONE-HALF TO W. W. WAGG, OF MOOSE JAW, SASKATCHEWAN, CANADA.

CONVEYER FOR BINDING-MACHINES.

1,135,146.   Specification of Letters Patent.   Patented Apr. 13, 1915.

Application filed April 13, 1914. Serial No. 831,387.

*To all whom it may concern:*

Be it known that I, GEORGE R. STRICKLAND, a citizen of the United States, and a resident of the city of Chicago, county of Cook, and State of Illinois, have invented certain new and useful Improvements in Conveyers for Binding-Machines; and I do hereby declare that the following is a full, clear, and exact description of the same, reference being had to the accompanying drawings, and to the numerals of reference marked thereon, which form a part of this specification.

Great difficulty is usually experienced with the conveying and elevating mechanisms of self-binding harvesting machines, owing to the fact that the grain is sometimes lost between the respective mechanisms. Another serious defect has been the wedging or jamming of the stalks or straw at the junction of the respective conveying and elevating mechanisms. It is my intention to obviate these difficulties by constructing a mechanism wherein the stalks or straw are moved in proper position from the receiving apron to the elevating means, and at no time are they actually supported upon the moving means proper, but only conveyed along thereby. Accordingly I mount the supporting apron over which the grain is moved by the conveying mechanism in a yieldable manner, and bridging the entire space between the conveying and elevating mechanisms, so that in the event of jamming or wedging of the contents thereon, the support yields an amount sufficient for the device to accommodate itself to the abnormal conditions, until the proper normal operating conditions are restored. The grain is thus efficiently handled without breaking or otherwise damaging the same or loss between the respective mechanisms, and without causing delays in the operation of the machine.

This invention relates to a conveying means and elevating mechanism for use with a self-binding harvester wherein the grain is positively supported upon stationary means designed to support and permit an easy movement of the grain thereover and associated with moving mechanism acting to convey and elevate the grain on the support to a proper position for discharge and binding.

It is an object of this invention to construct a device embracing a resiliently mounted stationary apron with conveying mechanism acting to move grain therealong in a manner permitting the apron to yield in the event of jamming or wedging of the grain.

It is also an object of this invention to construct a device in which a yieldably mounted and hingedly connected support is provided to receive the grain thereon and conveying mechanism disposed above and below the support to co-act therewith to transfer the grain thereon and elevate the same to a point of discharge.

It is also an object of this invention to construct a device wherein a yieldably mounted and hingedly connected apron provided with slots is associated with conveying mechanism, the fingers of which project through the slots acting to convey grain and with elevating mechanism adapted to move the grain upwardly to a point of discharge on said apron.

It is furthermore an object of this invention to construct a conveying and elevating device for grain wherein the grain is at all times supported upon a stationary apron, the parts of which are hingedly connected and yieldably mounted, permitting the grain moved thereover by the conveying mechanism to be properly handled even in the event of a surplus quantity tending to become wedged at any point.

It is finally an object of this invention to construct a conveying and elevating mechanism consisting of few parts, and one wherein the grain in passing from the conveying to the elevating mechanism is supported by a yieldably mounted means acting to prevent jamming thereof at any point in its passage, and effectually bridging the space between the respective mechanisms to prevent loss of any of the material therebetween.

The invention (in a preferred form) is illustrated in the drawings and hereinafter more fully described.

In the drawings: Figure 1 is a top plan view of a device embodying the principles of my invention. Fig. 2 is a section on line 2—2 of Fig. 1. Fig. 3 is a perspective view of the apron used in my device. Fig. 4 is a fragmentary plan view of the discharge end thereof. Fig. 5 is a fragmentary section taken on line 5—5 of Fig. 1, and showing the means of supporting the discharge end of the apron. Fig. 6 is a view similar to Fig. 2, showing a slightly modified form of apron. Fig. 7 is a fragmentary plan view of a modified form of apron of that portion between the conveying and elevating mechanisms of the device. Fig. 8 is an enlarged fragmentary section taken on line 8—8 of Fig. 7.

As shown in the drawings: The device comprises the frame embracing a floor 1, an end wall 2, and side walls 3, a portion 4, of each of which is extended upwardly on each side of the frame to afford supporting means for an elevating mechanism and also to prevent lateral displacement of the grain from the device. An apron section 5, provided with a plurality of longitudinal parallel slots 6, is supported at one of its ends upon the end wall 2, and held releasably thereon by hand screws 7, engaging through slots 8, provided in the end of the apron intermediate said longitudinal slots 6. The other end of said apron section 5, is turned downwardly and pivotally connected to another apron section 9, by a hinge 10, said apron section 9, curving downwardly from said apron 5, and upwardly at an inclination corresponding substantially to the inclination of the extended wall portions 4.

The hingedly connected portions of the aprons 5 and 9, are yieldably supported by spring elements 11, which are attached to the under curved portion of the apron 9, and rest freely upon the floor 1, of the frame. At its upper end said apron 9, is hingedly connected to a short section 12, by means of a hinge 13, said short section 12, being in turn hingedly connected to a slotted section 14, by means of a hinge 15, and said slotted section 14, resting upon an inclined discharge table 16, with bolts 17, engaged therein through said slots to hold said section 14, slidably thereon. The upper end of said apron section 9, is yieldably supported by spring members 18, which bear against the under surface thereof and are secured beneath the discharge floor or table 16.

Mounted transversely of the frame and above the floor 1, and beneath the apron section 5, are conveyer rollers 19 and 20, respectively, and trained therearound is a conveyer 21, of any suitable construction provided with stops or fingers 22, which on the upper run of said conveyer, project through the slots 6, in the apron section 5, acting to move the grain received thereon. Similarly conveyer rolls 23 and 24, respectively, are journaled between the extended side walls 4, of the frame, the one elevated above the other, such that a conveyer 25, trained thereupon, is inclined with respect to the conveyer 21. Said conveyer or elevating mechanism 25, is provided with stops or fingers 26, similarly to the conveyer 1, already described, and the fingers on the under run of the latter conveyer sweep above the apron section 9, acting to elevate the grain thereon by sliding the same upwardly to the point of discharge.

A gear 27, is secured upon one end of the roll 23, beyond the side wall 4, of the frame, and meshes with a gear 28, journaled upon a stud shaft 29, mounted in said side wall. A sprocket wheel 30, is rigidly secured to said gear 29, and trained thereabout and about a sprocket wheel 31, rigidly secured upon the end of the roll 20, is a chain 32, which acts to transmit a drive, together with said intermeshing gears, between the respective conveying mechanism 21, and elevating mechanism 25. A drive to the gear 28, or roll 23, may be provided in any suitable manner, as for instance, a gear mounted on and forming a part of the harvesting machine may mesh with said gear 28.

In the modified type of my device illustrated in Figs. 6 to 8 inclusive, the construction is substantially the same with the exception that I have inserted an extra hingedly connected section 33, between the apron 5, and the apron 9, thus obtaining a slightly greater amount of flexibility to permit adjustment without stressing the parts an undue amount.

The operation is as follows: The harvested grain is delivered upon the receiving apron section 5, along which it is moved by the fingers 22, projecting through the slots in said apron, and discharged over and down the curved end of said apron 5, upon the resiliently supported apron section 9. Here the flax or other product, whatever it may be, is engaged by the fingers 26, forming a part of the elevating mechanism, which move the grain upwardly and over the sections 12 and 14, to the discharge table or floor 16. It has been found in practice in other machines that at such points as the lower and upper end of the apron 9, that the material handled sometimes becomes jammed or wedged and is damaged considerably in removing the same, and also causes a delay in the operation of the device. Owing, however, to the resilient support of the respective hinged ends of the apron 5 and 9, as indicated by the reference numeral 11, in the event of a surplus amount of grain, (or due to any other conditions) causing a tendency of the grain to wedge beneath the roll 24, the apron yields sufficiently until the normal operating conditions are again automatically restored as the surplus amount of grain is carried away and discharged. Similarly, at the upper end of the apron section 9, the resilient supports 18, yield in the event of a jamming or wedging of the grain taking place.

Among the chief advantages of this construction is the fact that the apron which bridges the entire space between the respective conveying and elevating mechanisms seems to prevent loss of the grain which may be shelled out in the handling of the material, inasmuch as it is caught on the apron and brushed or carried upwardly to the point of discharge, where a suitable receptacle to receive the same may be placed.

As already pointed out, the slotted apron section 5, is hingedly connected by means of the hinge 10, to the section 9, so that by turning the hand screws 7, into a longitudinal position the apron may be swung upwardly, giving access to the conveyer 21, for repairs or any other purpose desired.

I am aware that various details of construction may be varied through a wide range without departing from the principles of this invention. I therefore do not purpose limiting the patent granted otherwise than necessitated by the prior art.

I claim as my invention:

1. In a device of the class described a slotted apron, conveying mechanism projecting therethrough adapted to move grain therealong, an inclined apron hingedly connected to said slotted apron, elevating mechanism associated therewith to move grain therealong and upwardly to a point of discharge, and a resilient support for said connected aprons.

2. In a device of the class described hingedly connected aprons, one having slots therein and the other inclined therefrom, conveying mechanism projecting through the slots in the one adapted to move grain therealong, elevating mechanism mounted above the other inclined apron to move the grain upwardly thereon, a plurality of sections connected at the upper end of said inclined apron and capable of movement therewith, and a resilient support for said aprons, permitting the same to yield with a jamming of grain thereon.

3. In a device of the class described hingedly connected and resiliently supported aprons to receive material thereon, and conveying and elevating mechanisms associated therewith to transfer and elevate the material to a point of discharge.

4. In a device of the class described conveying mechanism, elevating mechanism, driving connections therebetween, a slotted apron mounted above said conveying mechanism adapted to support grain thereon with parts of the conveying mechanism projecting therethrough to move the grain therealong, and a curved and inclined hingedly connected sectional apron mounted beneath said elevating mechanism to receive the grain moved thereto by said conveying mechanism to support the grain while it is elevated to a point of discharge.

5. In a device of the class described hingedly connected and resiliently mounted aprons, and conveying and elevating mechanisms associated therewith to receive and transfer the material and elevate the same to a point of discharge.

6. In a device of the class described a plurality of apron sections, resilient means yieldingly supporting one in position, the other hingedly connected thereto, means releasably holding the latter in position and permitting the same to be swung upwardly, and conveying and elevating mechanisms associated to coöperate with said apron to transfer and elevate the grain to a point of discharge.

7. In a device of the class described a frame, a slotted apron releasably supported thereon, a curved inclined apron resiliently mounted on said frame, an apron section hingedly connected to said slotted section and said inclined section permitting relative movement therebetween, and elevating and conveying mechanism associated therewith to transfer and elevate the grain to a point of discharge.

8. In a device of the class described conveying and elevating mechanisms, a continuous linked supporting means for a material to be handled associated therewith and bridging the space therebetween, and a plurality of spring elements underneath said supporting means to permit movement thereof.

9. A device of the class described comprising an independent conveying mechanism, an independent elevating mechanism spaced therefrom, and removable sectional supporting means for material handled by the device associated with said mechanisms and bridging the space therebetween to prevent loss of material passing from the field of operation of one, to that of the other of said mechanisms.

10. In a device of the class described the combination with a plurality of simultaneously actuated conveyers, of a continuous removably secured hingedly connected sectional apron, adapted for receiving and supporting material transferred by said conveyer and resilient supporting members below said apron adapted to take up excess stress thereon.

In testimony whereof I have hereunto subscribed my name in the presence of two subscribing witnesses.

GEORGE R. STRICKLAND.

Witnesses:
CHARLES W. HILLS, Jr.,
FRANK K. HUDSON.